(12) United States Patent
Marra et al.

(10) Patent No.: US 11,555,626 B2
(45) Date of Patent: Jan. 17, 2023

(54) VENTILATION UNIT, SYSTEM AND METHOD

(71) Applicant: KONINKLIJKE PHILIPS N.V., Eindhoven (NL)

(72) Inventors: Johannes Marra, Eindhoven (NL); Achim Gerhard Rolf Koerber, Eindhoven (NL); Cornelis Reinder Ronda, Aachen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 132 days.

(21) Appl. No.: 16/636,354

(22) PCT Filed: Aug. 1, 2018

(86) PCT No.: PCT/EP2018/070823
§ 371 (c)(1),
(2) Date: Feb. 4, 2020

(87) PCT Pub. No.: WO2019/034421
PCT Pub. Date: Feb. 21, 2019

(65) Prior Publication Data
US 2020/0166235 A1 May 28, 2020

(30) Foreign Application Priority Data

Aug. 15, 2017 (EP) .................................... 17186232

(51) Int. Cl.
*F24F 11/74* (2018.01)
*F24F 7/04* (2006.01)
(Continued)

(52) U.S. Cl.
CPC ................ *F24F 11/74* (2018.01); *F24F 7/04* (2013.01); *F24F 13/0227* (2013.01);
(Continued)

(58) Field of Classification Search
CPC .......... F24F 11/74; F24F 7/04; F24F 13/0227; F24F 13/12; F24F 2110/20;
(Continued)

(56) References Cited

U.S. PATENT DOCUMENTS 9,464,818 B2 * 10/2016 Holm ...................... F24F 7/007
9,618,222 B1 * 4/2017 Hussain ............. G05D 23/1917
(Continued)

FOREIGN PATENT DOCUMENTS

CN    201333356 Y    10/2009
CN    101957040 A    1/2011
(Continued)

OTHER PUBLICATIONS

International Search Report and Written Opinion dated Oct. 2, 2018 for International Application No. PCT/EP2018/070823 Filed Aug. 1, 2018.
(Continued)

*Primary Examiner* — Jessica Yuen
(74) *Attorney, Agent, or Firm* — Schott, P.C.

(57) ABSTRACT

A ventilation unit is for ventilating an indoor space, and incorporates an air cleaning device and mechanical restrictor for controlling a restriction to a flow resulting from a pressure differential across the unit. There is determination of the inside and outside air pressures in the vicinity of the unit and of air quality parameters inside and outside. The air cleaning device and the mechanical restrictor are controlled in dependence on the determined air pressures and air quality parameters. This provides a fan-less, and hence low-power ventilation unit, which relies on throttling the natural air flow across the unit to provide flow control, and hence enable control of air quality. The air cleaning device may be operated only when the flow is into the inside space, saving power.

17 Claims, 3 Drawing Sheets

(51) Int. Cl.
  *F24F 13/02*   (2006.01)
  *F24F 13/12*   (2006.01)
  *F24F 110/20*  (2018.01)
  *F24F 110/22*  (2018.01)
  *F24F 110/40*  (2018.01)
  *F24F 110/10*  (2018.01)
  *F24F 110/12*  (2018.01)
  *F24F 110/52*  (2018.01)
  *F24F 11/00*   (2018.01)

(52) U.S. Cl.
  CPC ....... *F24F 13/12* (2013.01); *F24F 2011/0002* (2013.01); *F24F 2110/10* (2018.01); *F24F 2110/12* (2018.01); *F24F 2110/20* (2018.01); *F24F 2110/22* (2018.01); *F24F 2110/40* (2018.01); *F24F 2110/52* (2018.01)

(58) Field of Classification Search
  CPC ............... F24F 2110/22; F24F 2110/40; F24F 2110/10; F24F 2110/12; F24F 2110/52; F24F 2011/0002
  See application file for complete search history.

(56) References Cited

U.S. PATENT DOCUMENTS

| | | | | |
|---|---|---|---|---|
| 9,618,224 | B2* | 4/2017 | Emmons | G05B 19/048 |
| 10,197,297 | B2* | 2/2019 | Daniels, II | F24F 7/02 |
| 10,295,209 | B2* | 5/2019 | Yabunouchi | F24F 11/30 |
| 2007/0072541 | A1 | 3/2007 | Daniels | |
| 2008/0092742 | A1* | 4/2008 | Marra | B60H 1/008 96/16 |
| 2008/0182506 | A1 | 7/2008 | Jackson | |
| 2011/0265648 | A1 | 11/2011 | Meirav | |
| 2013/0239803 | A1 | 9/2013 | Palmer | |
| 2015/0352479 | A1 | 12/2015 | Kim | |
| 2019/0381516 | A1 | 12/2019 | Marra | |
| 2021/0172632 | A1* | 6/2021 | Saunders | F24F 11/65 |

FOREIGN PATENT DOCUMENTS

| | | |
|---|---|---|
| CN | 103743053 A | 4/2014 |
| CN | 105674461 A | 6/2016 |
| CN | 106471202 A | 3/2017 |
| EP | 1752715 | 2/2007 |
| KR | 100765164 | 10/2007 |
| WO | 2006/016346 | 2/2006 |
| WO | 2016146885 | 9/2016 |

OTHER PUBLICATIONS

Adachi, et al: "Unipolar and bipolar diffusion charging of ultrafine aerosol particles", Journal of Aerosol Science vol. 16, Issue 2, 1985, pp. 109-123.

Chapter 3 "Uniform Particle Motion", in the book of W.C. Hinds "Aerosol Technology: Properties, Behavior and Measurement of Airborne Particles" 2nd Edition (John Wiley & Sons), 1999.

Chapter 9 "Filtration", in the book of W.C. Hinds "Aerosol Technology: Properties, Behavior and Measurement of Airborne Particles" 2nd Edition (John Wiley & Sons), 1999.

* cited by examiner

VENTILATION UNIT, SYSTEM AND METHOD

CROSS REFERENCE TO RELATED APPLICATIONS

This application is the U.S. National Phase application under 35 U.S.C. § 371 of International Application No. PCT/EP2018/070823 filed Aug. 1, 2018, published as WO 2019/034421 on Feb. 21, 2019, which claims the benefit of European Patent Application Number 17186232.9 filed Aug. 15, 2017. These applications are hereby incorporated by reference herein.

FIELD OF THE INVENTION

The invention relates to methods and apparatus for ventilating an indoor air space.

BACKGROUND OF THE INVENTION

A healthy indoor climate can be attained by providing comfortable relative humidity and temperature (RH,T) conditions and clean indoor air. The use of indoor air cleaners can help to improve the indoor air cleanliness but cannot replace the need for ventilation with outdoor air.

Ventilation is effective for displacing a host of indoor-generated pollutants and odors that cannot (easily) be cleaned by means of filtration. Furthermore, it displaces indoor-generated moisture and CO2 to outdoors. In addition, because the overall indoor air pollution level is usually higher than the outdoor air pollution level, ventilation is an unobtrusive, robust and low-cost means to lower the indoor air pollution level.

Most residential homes and many buildings/offices rely on natural ventilation, where outdoor air enters and indoor air leaves the "leaky" home/building under the influence of the local air pressure differentials between outdoors and indoors that exist throughout the home/building. The incoming outdoor air at locations where the outdoor air pressure exceeds the indoor air pressure displaces an equal amount of indoor air to outdoors at locations where the indoor air pressure exceeds the outdoor air pressure. The magnitude and sign of the local air pressure differentials throughout the building vary and depend on the speed and direction of the wind outdoors.

While natural ventilation is advantageous because of its unobtrusiveness, it has the disadvantage that it also allows outdoor air pollutants to enter the home. This is particularly problematic in places that suffer from high outdoor air pollution levels. Furthermore, its effectiveness depends on outdoor weather conditions (wind speed/direction) and the relative "leakiness" of the building. Well-insulated low-leakage buildings are notorious for suffering from poor indoor air quality conditions because the pertaining natural ventilation levels are often too low. Preferably, natural ventilation in a residential home should occur at a rate where the complete air volume in a room is exchanged at least once every two hours. Finally, natural ventilation can adversely affect indoor comfort conditions when the natural ventilation level is high in combination with extreme (cold, hot) outdoor air temperatures in winter and summer.

Electrostatic air (or other gas) cleaning devices may be used for filtering pollutants from the air to be provided to an indoor space. Electrostatic air cleaning devices are typically embodied as corona discharge devices.

Corona discharge devices apply a high voltage potential to charge particles and create a corona discharge, and there is also a large voltage between collector electrodes and counter electrodes to collect most of the particles charged by the corona discharge. The particle charging is obtained through the adsorption of corona-generated ions on the airborne particles. Collisions between the ions generated by the corona and surrounding gas molecules also transfer the momentum of the ions to the gas thereby inducing a corresponding movement of the air to achieve an overall movement of air in a desired air flow direction. A fan can also be used to provide further control of the air flow through the device.

Following particle charging, the charged particles are precipitated from air onto a set of collecting electrodes. Together with a set of precipitation electrodes, the collecting electrodes form parallel-plate structures wherein each collection electrode plate is positioned in parallel between two precipitation electrode plates thereby maintaining a controlled spacing between neighboring plates that serves as air conduit. This device design is popular because particle capture from air can be realized at a lower energy consumption than when mechanical fibrous filters are used. This is due to the incurred lower air pressure drop when air is passed through the straight conduits between the parallel plates in the electrostatic particle filter. Moreover, the parallel-plate structures can be easily cleaned in a dishwasher or washed by hand and thus regenerated when they contain large amounts of captured particles. Fibrous particle filters cannot easily be regenerated and must be discarded as waste.

The above-mentioned problems with natural ventilation can be dealt with by replacing natural ventilation with mechanical ventilation through an HVAC (Heating, Ventilation, Air Conditioning) system. A HVAC system is capable of supplying indoor spaces with adequate amounts of filtered ventilation air from outdoors at comfortable temperature and humidity levels. However, HVAC systems are costly, bulky, noisy, energy-hungry, and require ductwork for air transport throughout the building. Similarly, fan operated electrostatic particle precipitation filters or mechanical fibrous particle filters also consume significant amounts of energy.

Reliance on natural ventilation is therefore often preferred in temperate climates but problematic for the indoor air quality in situations wherein a high outdoor air pollution exists.

US 2007/0072541 discloses a natural ventilation system in which vents are controlled to achieve target conditions such as temperature, temperature differential between indoor and outdoor, pressure, pressure differential or rate of air changes in a building.

SUMMARY OF THE INVENTION

The invention is defined by the claims.

According to an aspect of the invention, there is provided a ventilation unit for ventilating an indoor space by natural ventilation, comprising:
 a first air port for positioning outside the indoor space;
 a second air port for positioning inside the indoor space;
 an air cleaning device between the first and second air ports;
 a mechanical restrictor for controlling a restriction to a flow between the first and second air ports, wherein the flow results from a pressure differential between the first and second air ports;

a pressure sensing arrangement for determining the air pressures or the air pressure difference in the vicinity of the first and second air ports;

a first air quality determination system for determining air quality parameters relating to the space outside the indoor space;

a second air quality determination system for determining air quality parameters relating to the indoor space; and a controller, wherein the controller is adapted to control the air cleaning device and the mechanical restrictor in dependence on the determined air pressures and air quality parameters.

This ventilation unit relies on natural air flow caused by a naturally occurring pressure difference between the outside and inside space, for example dependent on the outside wind direction and speed. The unit avoids the need for bulky mechanical HVAC systems but improves the controllability of a purely passive natural ventilation system. Instead it involves the use of a unit which may be considered to be a "ventilation air cleaning device" (VACD). The unit may for example be mounted in walls or windows. The unit still relies on natural ventilation with incoming and exiting air flows that are driven by the air pressure differentials between outdoors and indoors that exist at the VACD locations. The VACD does not comprise a mechanical ventilator and is designed such that it can sustain a high airflow rate, even when the pressure differential across the VACD is relatively small.

The unit is therefore particularly suitable for use in well-insulated homes that would otherwise frequently suffer from inadequate ventilation levels. The unit is for example capable of cleaning the incoming ventilation air from particle pollution and can for example reduce the incoming ventilation air flow rate down to the minimum required ventilation level in case of extreme outdoor air temperatures and/or relative humidity (RH) levels.

In addition, the ventilation air flow rate can be increased to respond to a measured high indoor particle pollution level. The unit thus provides an energy-efficient and unobtrusive method that is capable of actively responding to changing indoor and outdoor conditions, thereby supplying indoor spaces with controlled amounts of a least partially-cleaned ventilation air from outdoors.

A controlled reduction of the natural airflow through the unit is accomplished by the mechanical restrictor, such as an adjustable air inlet.

The air quality parameters for example comprise temperature and relative humidity. These parameters in particular influence the comfort of the occupants of the indoor space.

The air quality parameters may also comprise a particle pollution level. This is of particular importance for controlling allergens or for health reasons generally.

The controller may be adapted to:

implement a minimum flow restriction when the air quality parameters relating to the space outside the indoor space meet a first set of indoor air quality requirements and/or implement a maximum flow restriction when the air quality parameters relating to the space outside the indoor space meet a second set of indoor air quality requirements.

In this way, the flow is controlled to maintain desired air quality in the inside space. By way of example, if there is high indoor pollution or if the outdoor air quality is good, the flow restriction may be minimum. If the outdoor air quality is poor, the flow restriction is a maximum, unless the inside air quality is equally poor or worse.

The controller may be adapted to implement control of the flow restriction to provide a number of air changes per hour of the indoor space which falls within a set range. This control is possible if there is freedom to set the flow restriction between the maximum and minimum values. The set range may for example be 0.25 to 2.5 air changes per hour.

The air cleaning device for example comprises an electrostatic air cleaning device which comprises:

a particle charging section;

a particle precipitation section, comprising parallel electrode plates;

a source of electric potential for applying a voltage between adjacent electrode plates in the precipitation section;

This provides a parallel-plate electrostatic precipitator capable of cleaning the outdoor air from airborne particles when the precipitator is electrically activated. Its activation is also enabled by the controller: it is for example switched on when polluted outdoor air enters via the VACD to indoors, and is switched off when indoor air passes via a VACD back to outdoors or when the outdoor air is sufficiently clean.

The electrostatic air cleaning device for example comprises a current sensor for measuring an electric current flowing through the electrode plates, and wherein the controller is adapted to determine a level of particle precipitation from the measured current flowing through the electrode plates.

In this way, the status of the activated electrostatic precipitator may be monitored by the controller by recording the leakage current through the precipitator's electrode plates as a function of the relative humidity of the air passing through the VACD. In addition, the total amount of particles precipitated may be estimated by integrating the measured current over time. As such, the controller may then deliver an output warning message to the user when the VACD needs to be cleaned.

There may be a first, normal, operation mode when the measured current flowing through the electrode plates is below a current threshold.

A second mode may be provided when the measured current flowing through the electrode plates is above the current threshold and the source of electric potential is controlled to reduce the current, and the measured current is determined to be caused by a high relative humidity.

A third mode may be provided when the measured current flowing through the electrode plates is above the current threshold and the source of electric potential and the flow controller are controlled to reduce the current, and the measured current is determined to be caused by the level of particle deposition in the particle precipitation section. Cleaning or replacement of the precipitation section may then be signaled as required.

This device controls the electrostatic air cleaning process taking account of the current flowing through the precipitation electrodes, and it also takes account of the prevailing relative humidity of the air passing through the air cleaning device. The current is a leakage current, and it is indicative of particle build up on the precipitation plate electrodes and on the surfaces of the spacers that maintain a fixed distance between adjacent electrode plates. The voltage applied between adjacent electrode plates is controlled so that the leakage current is limited, and this prevents damage to the power source (i.e. the source of electric potential) and hazardous situations such as a fire. Resulting short circuits may also be audible and they may also create a smell.

An output device may be provided giving an output relating to one or more of:
    the contamination status of the air cleaner device;
    the air quality parameters relating to the space outside the indoor space; and
    the air quality parameters relating to the indoor space.

The invention also provides a ventilation system comprising:
    a plurality of ventilation units each as defined above; and
    a communications system for enabling communication between the controllers
    of each ventilation unit thereby to enable coordinated control of the ventilation units.

In this way, the desired indoor air replacement with cleaned ventilation air from outdoors may be obtained based on the control of multiple units.

Examples in accordance with another aspect of the invention provide a method of ventilating an indoor space by natural ventilation using a ventilation unit between the indoor space and an outside space, comprising:
    determining the air pressures in, or the air pressure difference between, the indoor space and the outside space in the vicinity of the ventilation unit;
    determining air quality parameters in the outside space;
    determining air quality parameters in the indoor space; and
    controlling an air cleaning device of the ventilation unit and controlling a restriction to a flow across the ventilation unit, which flow results from a pressure differential between the indoor space and the outside space, in dependence on the determined air pressures and air quality parameters.

The air quality parameters for example comprise temperature, relative humidity and a particle pollution level.

The method may comprise:
    implementing a minimum flow restriction when the air quality parameters relating to the space outside the indoor space meet a first set of indoor air quality requirements; and
    implementing a maximum flow restriction when the air quality parameters relating to the space outside the indoor space meet a second set of indoor air quality requirements.

Control of the flow restriction may otherwise provide a number of air changes per hour of the indoor space which falls within a set range.

The control method may be implemented at least in part in software.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides a ventilation unit for ventilating an indoor space which incorporates an air cleaning device and a mechanical restrictor for controlling a restriction to a flow resulting from a pressure differential across the unit. There is determination of the inside and outside air pressures in the vicinity of the unit and of air quality parameters inside and outside. The air cleaning device and the mechanical restrictor are controlled in dependence on the determined local air pressures and air quality parameters. This provides a fan-less, and hence low-power ventilation unit, which relies on throttling the natural air flow across the unit to provide flow control, and hence enable control of air quality. The air cleaning device may be operated only when the flow is into the inside space, saving power.

Figure 1:
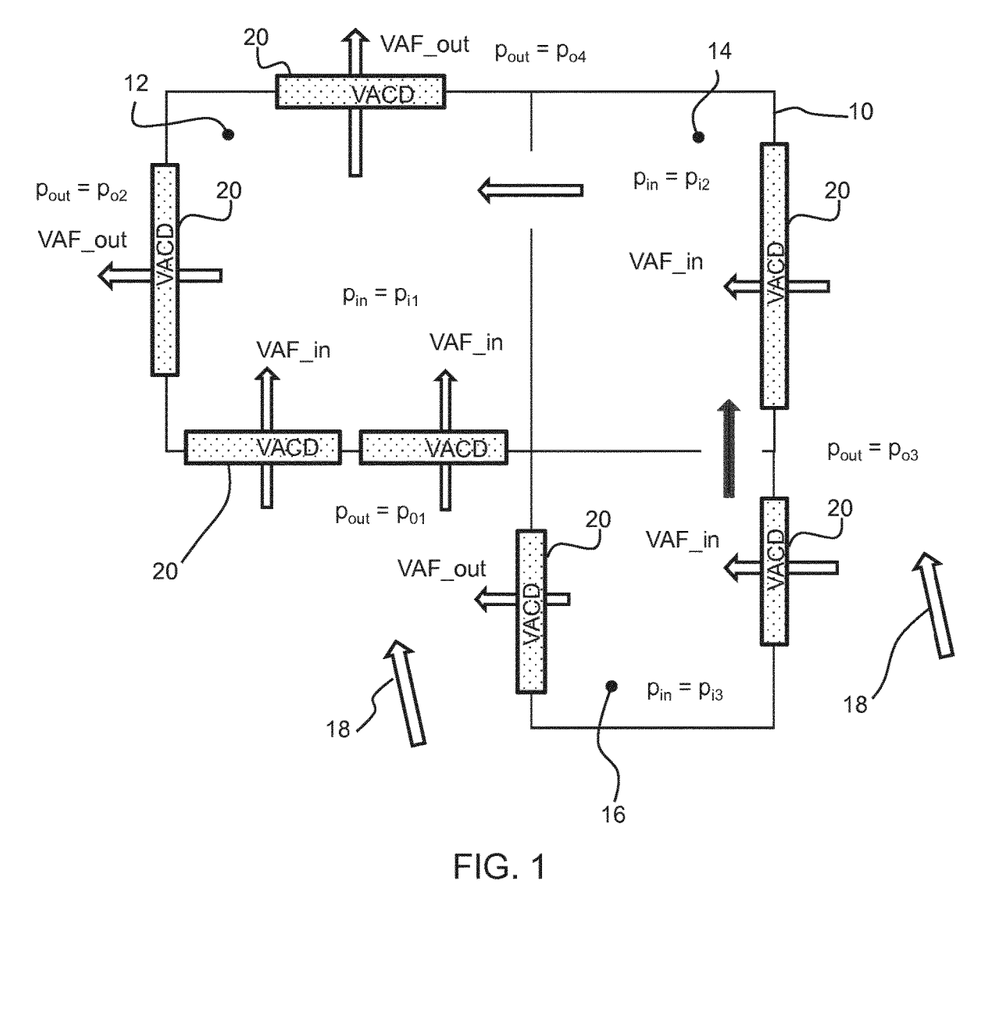
FIG. 1 shows a building with a set of ventilation units installed.

FIG. 1 shows a top view of a building 10 having three connected indoor spaces (i.e. rooms) 12, 14, 16. The building is located in an outdoor environment wherein a wind 18 is blowing from a certain direction. Air enters or leaves the indoor spaces 12, 14, 16 via ventilation and air cleaning devices (VACD) 20 that are mounted in the windows or outer walls of the indoor spaces.

The wind induces pressure differentials $\Delta p = p_{out} - p_{in}$ between outdoors and indoors. Different sides of the building will have different outdoor pressures $p_{out}$, shown as $p_{o1}$ to $p_{o4}$. Similarly, the different indoor spaces may also be at different indoor pressures $p_{in}$, shown as $p_{i1}$ to $p_{i3}$. The magnitude and sign of $\Delta p$ depends on the location in the indoor spaces as shown in FIG. 1.

When $\Delta p > 0$ at the location of a VACD, the pressure difference induces an incoming ventilation air flow (VAF) of outdoor ventilation air through the VACD, denoted as VAF_in in FIG. 1. A pressure $\Delta p < 0$ induces an outgoing flow of indoor air to outdoors denoted as VAF_out in FIG. 1. Air flow between adjacent indoor spaces occurs when the spaces are at different indoor pressure levels.

Figure 2:
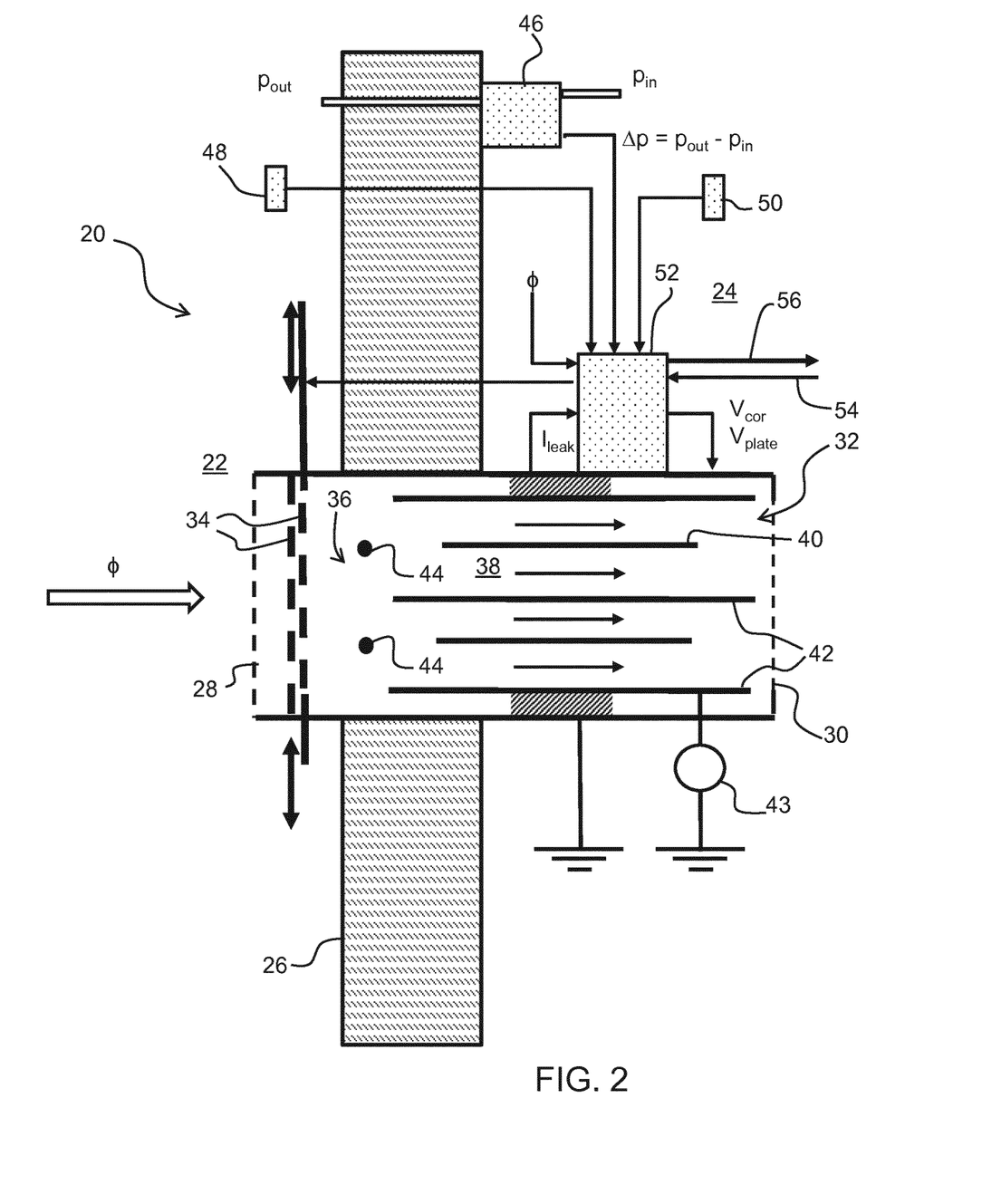
FIG. 2 shows one ventilation unit in more detail.
Figure 3:
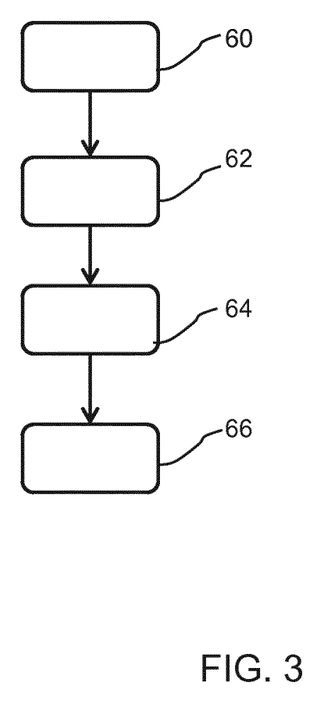
FIG. 3 shows a ventilation method.

FIG. 2 shows one of the VACDs 20 in more detail. In this example, air from outdoors 22 passes as ventilation air into the indoor space 24 under the driving force of the local differential pressure $\Delta p = p_{out} - p_{in} > 0$.

The unit extends through a wall 26 and has a first air port 28 for positioning outside the indoor space (i.e. outdoors) and a second air port 30 for positioning inside the indoor space. An air cleaning device 32 is provided between the first and second air ports 28, 30.

The first air port 28 incorporates a front grille capable of arresting coarse airborne dust. Behind the front grille is an adjustable air inlet 34 which functions as mechanical restrictor for controlling a restriction to a flow between the first and second air ports 28, 30. In one example it comprises a first orifice plate which slides relative to a second orifice plate so that the orifices either line up or are partially or fully blocked.

In the example shown, the air cleaning device is an electrostatic particle filter, comprising a particle charging section 36 which receives a polluted air flow at an airflow rate $\phi$. A particle precipitation section 38 comprises an array of parallel plates 40, 42 held in position by electrically insulating spacers of a spacer array. The plates comprise alternate precipitation electrodes 40 and collector electrodes 42.

The particle charging section 36 comprises one or more upstream high-voltage corona wires 44 at potential $V_{cor}$ for ionizing the air, thereby charging incoming airborne particles. $V_{cor}$ is preferably positive to minimize the ozone production that results from air ionization.

The precipitation section 38 provides electrostatic precipitation of positively charged airborne particles on the collector electrodes 42 (at zero potential) through a positive voltage $V_{plate}$ applied to the precipitator electrodes 40. Alternatively, a negative voltage $V_{plate}$ may be imposed on the collector electrodes when the precipitator electrodes are connected to zero (earth) potential.

The contamination status of the parallel-plate precipitator with deposited particles can be gauged from the electrical leakage current $I_{leak}$ flowing from the collector plates to zero (ground) potential. $I_{leak}$ is measured with a current meter placed between the grounded collector electrode plates and ground potential (shown as 43). Alternatively, when the precipitator electrode plates are set at zero (ground) potential instead, the current meter should connect the precipitator plates to ground potential.

The leakage current is the result of particle deposition on the insulating spacers that separate adjacent electrode plates (not shown). Especially at high outdoor RH values (above RH=70%), the particle deposits absorb moisture from air, thereby forming an electrical conductive path across the soiled spacer surfaces between the sets of collector and precipitator plates. This gives rise to a leakage current $I_{leak}$ to ground potential. $I_{leak}$ increases at increasing amounts of deposited particles in the precipitator section, at increasing $V_{plate}$ and at increasing relative humidity.

A differential pressure sensor 46 is used to measure the sign and magnitude of the local pressure difference in the vicinity of the unit, $\Delta p = p_{out} - p_{in}$.

An outdoor air quality sensor 48 is used for measuring the outside temperature $T_{out}$, and outside relative humidity $RH_{out}$ and the outdoor particle pollution level (for instance in terms of the $PM_{2.5}$ metric for fine dust particles and/or the particle surface area concentration metric for ultrafine dust particles).

An indoor air quality sensor 50 is used for measuring the inside temperature $T_{in}$ and the inside relative humidity $RH_{in}$ and the indoor particle pollution level.

In this way, a first air quality determination system is implemented for determining air quality parameters relating to the space outside the indoor space and a second air quality determination system is implemented for determining air quality parameters relating to the indoor space.

A controller 52 receives input data concerning the local pressure difference $\Delta p$ and the air quality parameters ($T_{in}$, $RH_{in}$, indoor particle pollution level, $T_{out}$, $RH_{out}$, outdoor particle pollution level), as well as the leakage current $I_{leak}$. Optionally, the flow rate $\phi$ is also measured and provided as input to the controller.

In addition, the multiple units as shown in FIG. 1 preferably communicate with each other. For example information may be received as input 54 about the values measured by other VACDs in the same indoor space.

In response to all of this received input data, the controller 52 changes the airflow through the VACD by adjusting the settings of its air inlet 34, and also controlling the operation of the air cleaning device by selecting values for $V_{cor}$ and $V_{plate}$.

The controller 52 may also provide an output signal/message 56 concerning the contamination status and operating status of the electrostatic particle precipitator in the VACD. Furthermore, output information is given about the indoor air quality and pollution levels and the outdoor air quality and pollution levels.

The overall aim of the system may for example be to provide each indoor space with a ventilation rate of at least a minimum level of 0.25 Air Changes per Hour (ACH) and a maximum level of 2.5 ACH, dependent on the indoor particle pollution level and the outdoor relative humidity and temperature levels.

When the outdoor temperature and relative humidity levels are close to comfortable indoor levels, the ventilation rate may be maximized irrespective of the indoor or outdoor pollution levels. In this way, a minimum flow restriction is implemented when the air quality parameters relating to the space outside the indoor space meet a first set of indoor air quality requirements. This first set for example defines a temperature in a first comfortable range and a relative humidity in a second comfortable range.

When the outdoor temperature and relative humidity levels are clearly uncomfortable, the ventilation rate is minimized unless the indoor particle pollution level is high (discussed further below). Thus, a maximum flow restriction is implemented when the air quality parameters relating to the space outside the indoor space meet a second set of indoor air quality requirements. This second set for example defines a temperature falling far outside a comfortable range (e.g. outside a third range which may be wider than the first range) and a relative humidity falling far outside a comfortable range (e.g. outside a fourth range which may be wider than the second range).

Between these two extreme control settings, the preferred ventilation rate can be controlled as a function of the outside relative humidity and temperature and indoor pollution level. The control may be determined by a dedicated algorithm that also accounts for the volume of the indoor space.

The airflow rate through a VACD as a function of its dimensions, the local pressure difference and the settings of its air inlet can be established by means of calibration.

The preferred ventilation rate of the indoor space is typically accomplished with more than one VACD. As mentioned above, the controller 52 of each individual VACD also receives input about the sign and magnitude of the pressure difference values measured near the other VACDs in the indoor space, so that each VACD can optimize its settings concerning the overall desired airflow rate, $V_{cor}$ and $V_{plate}$ such as to jointly achieve the required room ventilation rate with cleaned outdoor air according to a dedicated algorithm for the indoor space under consideration.

This algorithm accounts for the number of units in the indoor space, the pressure difference values experienced by these units and their design.

When the local pressure difference is positive, the unit is enabled to clean the incoming air unless the outdoor air is sufficiently clean. The $V_{plate}$ and $V_{cor}$ settings are then adjusted to the settings of the incoming airflow rate aiming to achieve a desired fractional air cleaning efficiency for example $\eta \geq 0.9$ for airborne particles of about 200 nm diameter.

From the field of particle filtration science, it is known that electrostatic parallel-plate precipitators have the lowest filtration efficiency for airborne particles measuring about 200 nm in diameter. Hence, a satisfactory filtration efficiency for 200 nm particles guarantees at least a similar and usually a higher air cleaning efficiency for airborne particles smaller or larger than about 200 nm.

When the local pressure difference is negative, the electrostatic precipitator in the VACD is not activated ($V_{cor} = V_{plate} = 0$) and the VACD merely acts to release indoor air to outdoors.

The fractional air cleaning efficiency will now be discussed in more detail. The plates 40, 42 have a length $L_{plate}$ and a plate separation $d_{plate}$ which is maintained by the spacer array.

The charged particles are precipitated onto the collector electrode plates by an electrostatic field:

$$E_{plate} = V_{plate}/d_{plate}$$

This field is set up between adjacent plates in the array. Typically encountered design values for the particle precipitation section in domestic air cleaners and the process parameters therein are:

3 mm $\leq d_{plate} \leq$ 10 mm,
3 kV $\leq V_{plate} \leq$ 10 kV,

0.5 kV/mm≤$E_{plate}$≤1.0 kV/mm, 0.5 m/s≤$v_{air}$≤1.5 m/s ($v_{air}$ is the average air speed in the conduit between adjacent electrode plates), 30 mm≤$L_{plate}$≤150 mm ($L_{plate}$ is the length of the electrode plates in the air flow direction), 150 mm≤$H_{plate}$≤400 mm ($H_{plate}$ is the height of the electrode plates in the direction perpendicular to the air flow direction), The number of electrode plates in the precipitation section can exceed 100, dependent on the above-mentioned design values and the volumetric airflow rate φ that needs to be cleaned by the cleaning device.

The fractional filtration efficiency $\eta(d_p)$ towards airborne particles of diameter $d_p$ that are charged with $n(d_p)$ elementary charges is, under conditions of laminar flow between the electrode plates, given by:

$$\eta(d_p) = \frac{n(d_p)eC_c(d_p)L_{plate}E_{plate}}{3\pi v_{av}\mu_{air}d_p d_{plate}} \quad \text{if} \quad \frac{n(d_p)eC_c(d_p)L_{plate}E_{plate}}{3\pi v_{av}\mu_{air}d_p d_{plate}} \leq 1$$

$$\eta(d_p) = 1 \quad \text{if} \quad \frac{n(d_p)eC_c(d_p)L_{plate}E_{plate}}{3\pi v_{av}\mu_{air}d_p d_{plate}} > 1$$

$v_{av}$ denotes the average air speed between the plates and is directly proportional to the flow rate $\phi$ at fixed dimensions of the precipitation section;

$\mu_{air}$ is the air viscosity ($\mu_{air}=1.8\times10^{-5}$ Pa·s at room temperature);

"e" is the elementary charge ($e=1.6\times10^{-19}$ C);

$C_c(d_p)$ is the Cunningham slip correction factor. For its dependence on the particle diameter $d_p$ reference is made to Chapter 3 in the book of W. C. Hinds "Aerosol Technology: Properties, Behavior and Measurement of Airborne Particles" $2^{nd}$ Edition (John Wiley & Sons).

Typical average values for the number of elementary charges $n(d_p)$ on a particle of diameter $d_p$ that result from ion adsorption in a corona discharge are (somewhat dependent on the intensity of the corona discharge current):

$n \approx 2-3$ for $d_p=80$ nm, $n \approx 5-6$ for $d_p=200$ nm.

Reference is made to Adachi et.al. in Journal of Aerosol Science 16 (1985) pp. 109-123, wherein particle charging is predicted on the basis of the Fuchs particle charging theory, and experimentally verified.

From the field of filtration technology (see for example Chapter 9 in the book "Aerosol Technology: Properties, Behavior and Measurement of Airborne Particles" referenced above), it is well-known that $\eta(d_p)$ reaches a minimum value $\eta(d_p)=\eta_{min}$ for particle sizes close to 200 nm diameter. The electrostatic filter is generally designed and operated such that, for $d_p$18 200 nm, $\eta_{min} \geq \eta_{set}$ set with $\eta_{set} \geq 0.9$. By way of example, the latter efficiency is approximately achieved at $L_{plate}=100$ mm when $v_{air}=1$ m/s, $d_{plate}=4$ mm and $E_{plate}=V_{plate}/d_{plate}=1$ kV/mm.

As mentioned above, the measured leakage current $I_{leak}$ as a function of the relative humidity of the outdoor air flowing through the electrode plates is a measure for the contamination status of the precipitator with deposited particles. At $RH_{out}>70\%$, and particularly when $RH_{out}>90\%$, the leakage current can also become substantial in a still relatively clean precipitator. To avoid a possible hazard, $I_{leak}$ should therefore be limited to a maximum set value $I_{leak,max}$ by means of a current-limiting circuit. This will inevitably be accompanied by a drop in $V_{plate}$ which in turn reduces the overall particle filtration efficiency $\eta(d_p)$.

By connecting the complete set of all zero-potential electrode plates via the current meter to zero or ground potential, the combined leakage current $I_{leak}$ to ground is measured. The current meter may be implemented simply as a current sense resistor, wherein the voltage across the resistor is measured and is then used as an input to a controller. The current meter is preferably enabled to measure a DC current baseline value as well as possible current spikes that may be superimposed thereon. The measured average electric leakage current $I_{leak}$ is then obtained from the total integrated charge Q passing through the current meter within a time period T as $I_{leak}=Q/T$. Preferably, $T \geq 10$ s and $I_{leak}$ may be determined in the course of time as a moving average from the measured charge over time.

If, at any relative humidity, $I_{leak}<I_{leak,max}$ then the particle filter is determined to be performing optimally and may make optimum use of the input power level. Preferably, $V_{plate,max}$ is chosen such as to yield a maximum electric field strength in the range $0.5\ kV/mm \leq E_{plate,max}=V_{plate,max}/d_{plate} \leq 1.0\ kV/mm$ between adjacent electrode plates.

If, at a high relative humidity ($RH>RH_{set}$), $I_{leak} \geq I_{leak,max}$ then $V_{plate}$ may be reduced until $I_{leak}=I_{leak,max}$ and the flow may also be reduced by increasing the flow resistance until $\eta(d_p)=\eta_{set}$ (for $d_p$~200 nm). This control setting is used when there is a high relative humidity and a higher leakage current at $V_{plate}=V_{plate,max}$ than a maximum leakage current level $I_{leak,max}$. The plate voltage is reduced until the leakage current drops to the maximum level. Furthermore, the airflow is reduced until a desired efficiency is reached.

If, at low relative humidity ($RH \leq RH_{set}$), $I_{leak} \geq I_{leak,max}$ then $V_{plate}$ is reduced until $I_{leak}=I_{leak,max}$ and the flow is reduced until $\eta(d_p)=\eta_{set}$ (for $d_p$~200 nm). This control setting is used when there is not a high relative humidity but the leakage current is higher than the maximum level. In this case, the high leakage current is primarily caused by the high degree of filter loading with particles rather than the humidity level, so a warning message "filter replacement recommended" or "filter cleaning recommended" is displayed. The filter is then loaded with a large amount of deposited particles, which may induce a high value for the leakage current even at relative humidity values below the set threshold $RH_{set}$.

FIG. 3 shows a method of ventilating an indoor space using a ventilation unit between the indoor space and an outside space.

In step 60, the air pressures in the indoor space and in the outside space in the vicinity of the ventilation unit are determined.

In step 62 the air quality parameters in the outside space are determined (temperature, relative humidity and a particle pollution level);

In step 64 the air quality parameters in the indoor space are determined.

In step 66 an air cleaning device of the ventilation unit is controlled as well as the restriction to the flow across the ventilation unit resulting from a pressure differential between the indoor space and the outside space. This control is dependent on the determined air pressures and air quality parameters.

As discussed above, embodiments make use of a controller. The controller can be implemented in numerous ways, with software and/or hardware, to perform the various functions required. A processor is one example of a controller which employs one or more microprocessors that may be programmed using software (e.g., microcode) to perform the required functions. A controller may however be implemented with or without employing a processor, and also may be implemented as a combination of dedicated hardware to perform some functions and a processor (e.g., one or more programmed microprocessors and associated circuitry) to perform other functions.

Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media such as volatile and non-volatile computer memory such as RAM, PROM, EPROM, and EEPROM. The storage media may be encoded with one or more programs that, when executed on one or more processors and/or controllers, perform the required functions. Various storage media may be fixed within a processor or controller or may be transportable, such that the one or more programs stored thereon can be loaded into a processor or controller.

It is described above how the device and method prevents the air cleaning device entering an unacceptable operating regime. However, the invention also enables prediction of the remaining useful life time of the precipitation filter, by measuring the leakage current $I_{leak}$ and by means of particle concentration sensing. The particle concentration sensing may be performed using a particle sensor in the air cleaning device and by particle sensors in the local environment. This provides information of interest for device servicing. This information may be provided as further output information and it may also take account of the relative humidity level.

The above-described inventive method to refresh the indoor air with cleaned ventilation air is under the driving force of the naturally existing pressure differentials between the indoor spaces and outdoors, and is thus fan-less, with no active positive flow control (only flow restriction control). The dominant air flow is caused by the pressure difference. There may also be an effect caused by an ionic wind of the air cleaner, but this is not actively controlled.

Instead of only implementing an electrostatic air cleaner inside the VACD for removing particles from incoming outdoor air, a non-electrostatic air cleaner may be implemented comprising a mechanical fibrous particle filter and/or one or more filters for absorbing or adsorbing gaseous pollutants such as $SO_2$, $NO_x$, $O_3$, and VOCs. The addition of a gaseous pollutant filter inside the VACD enhances the overall cleanliness of the filtered ventilation air and allows for control of both the indoor particle pollution level and the indoor gaseous pollution level. On the other hand, apart from possible issues with space constraints inside the VACD, it also raises the incurred pressure drop across the air cleaner at a given airflow rate $\phi$ and fixed dimensions of the VACD. This reduces the maximum attainable flow rate $\phi$ at a given pressure difference $\Delta p = p_{out} - p_{in}$ in the vicinity of the VACD. The same is true when the electrostatic parallel-plate particle filter is replaced by a mechanical fibrous particle filter. The envisaged reduction in $\phi$ can be counteracted by increasing the face area of the air cleaning filters.

The system is unobtrusive, relatively low-cost and requires only a minimum energy consumption. Because no ductwork throughout the house is required, the VACDs can also be installed via a retrofit in existing homes. The VACDs can respond smartly to changing outdoor air conditions and indoor conditions (in particular indoor particle pollution level) such as to find the optimum balance between adequate ventilation levels with cleaned outdoor air on the one hand and comfortable indoor conditions ($RH_{in}$, $T_{in}$) on the other hand.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A ventilation unit for ventilating an indoor space by natural ventilation, the ventilation unit comprising:
    a first air port for positioning outside the indoor space;
    a second air port for positioning inside the indoor space;
    an air cleaning device between the first and second air ports;
    a mechanical restrictor for controlling a restriction to a flow between the first and second air ports, wherein the flow results from a pressure differential between the first and second air ports;
    a pressure sensing arrangement for determining air pressures or an air pressure difference in the vicinity of the first and second air ports;
    a first air quality determination system for determining air quality parameters relating to a space outside the indoor space;
    a second air quality determination system for determining air quality parameters relating to the indoor space; and
    a controller,
    wherein the controller is adapted to:
        control the mechanical restrictor in dependence on the determined air pressures and air quality parameters; and
        control the air cleaning device in dependence on the determined air pressures and air quality parameters and in response to a determination that the flow, resulting from the pressure differential between the first and second air ports, is into the indoor space.

2. The ventilation unit as claimed in claim 1, wherein the air quality parameters comprise temperature and relative humidity.

3. The ventilation unit as claimed in claim 1, wherein the air quality parameters comprise a particle pollution level.

4. The ventilation unit as claimed in claim 1, wherein the controller is further adapted to:
    implement a minimum flow restriction when the air quality parameters relating to the space outside the indoor space meet a first set of indoor air quality requirements; and/or
    implement a maximum flow restriction when the air quality parameters relating to the space outside the indoor space meet a second set of indoor air quality requirements.

5. The ventilation unit as claimed in claim 1, wherein the controller is further adapted to implement the control of the flow restriction to provide a number of air changes per hour of the indoor space which falls within a set range.

6. The ventilation unit as claimed in claim 1, wherein the air cleaning device comprises an electrostatic air cleaning device which comprises:
    a particle charging section;
    a particle precipitation section, comprising parallel electrode plates; and a source of electric potential for applying a voltage between adjacent electrode plates in the particle precipitation section.

7. The ventilation unit as claimed in claim 6, wherein the electrostatic air cleaning device further comprises a current sensor for measuring an electric current flowing through the parallel electrode plates, and wherein the controller is further adapted to determine a level of particle precipitation from the measured electric current flowing through the parallel electrode plates.

8. The ventilation unit as claimed in claim 1, further comprising an output device for providing an output relating to one or more of:
- a contamination status of the air cleaning device;
- the air quality parameters relating to the space outside the indoor space; and
- the air quality parameters relating to the indoor space.

9. A ventilation system, comprising:
- a plurality of ventilation units each as claimed in claim 1; and
- a communications system for enabling communication between the controllers of each ventilation unit thereby to enable coordinated control of the ventilation units.

10. The ventilation unit as claimed in claim 1, wherein the controller is further adapted to:
- implement a minimum flow restriction when indoor air quality relating to the indoor space is lower than outdoor air quality relating to the space outside the indoor space; and
- implement a maximum flow restriction when the indoor air quality is higher than the outdoor air quality.

11. A method of ventilating an indoor space by natural ventilation using a ventilation unit of a ventilation system between the indoor space and an outside space, the method comprising:
- determining air pressures in, or an air pressure difference between, the indoor space and the outside space in the vicinity of the ventilation unit;
- determining air quality parameters in the outside space;
- determining air quality parameters in the indoor space;
- determining that a flow across the ventilation unit, resulting from a pressure differential between the indoor space and the outdoor space, is into the indoor space;
- controlling a restriction to the flow across the ventilation unit, resulting from the pressure differential between the indoor space and the outside space, in dependence on the determined air pressures and air quality parameters; and
- controlling an air cleaning device of the ventilation unit in dependence on the determined air pressures and air quality parameters and in response to determining that the flow across the ventilation unit, resulting from the pressure differential between the indoor space and the outside space, is into the indoor space.

12. The method as claimed in claim 11, wherein the air quality parameters comprise temperature, relative humidity, and a particle pollution level.

13. The method as claimed in claim 11, further comprising:
- implementing a minimum flow restriction when the air quality parameters relating to the outside space meet a first set of indoor air quality requirements; and
- implementing a maximum flow restriction when the air quality parameters relating to the outside space meet a second set of indoor air quality requirements.

14. The method as claimed in claim 11, further comprising implementing the control of the flow restriction to provide a number of air changes per hour of the indoor space which falls within a set range.

15. The method as claimed in claim 11, further comprising providing communication between multiple ventilation units of the ventilation system thereby to enable coordinated control of the ventilation units.

16. The method as claimed in claim 11, further comprising:
- implementing a minimum flow restriction when indoor air quality relating to the indoor space is lower than outdoor air quality relating to the outside space; and
- implementing a maximum flow restriction when the indoor air quality is higher than the outdoor air quality.

17. A computer program comprising computer program code means which is adapted, when said computer program is run on a computer, to implement the method of claim 11.

* * * * *